United States Patent

Vigh et al.

[15] 3,661,641

[45] May 9, 1972

[54] METHOD OF REMOVING POLYURETHANE RESIN PROTECTIVE COATING

[72] Inventors: Michael Walter Vigh; Harold Thomas Rocheleau, both of Northridge, Calif.

[22] Filed: Aug. 29, 1969

[21] Appl. No.: 854,323

[52] U.S. Cl. ....................................134/6, 106/311, 134/38, 134/42, 252/170, 252/364, 252/DIG. 8, 260/77.5 AP

[51] Int. Cl. ......................B08b 7/04, C23g 5/02, C11d 7/50

[58] Field of Search ..............260/77.5; 134/38, 42; 252/170, 252/364, DIG. 8; 106/311

[56] References Cited

UNITED STATES PATENTS

| | | | |
|---|---|---|---|
| 1,884,767 | 10/1932 | Lougovoy | 252/DIG. 8 |
| 2,563,417 | 8/1951 | Pessel | 134/6 |
| 2,929,800 | 3/1960 | Hill | 260/77.5 AM |
| 3,248,373 | 4/1966 | Barringer | 260/77.5 |
| 3,252,848 | 5/1966 | Borsellino | 260/77.5 |
| 3,331,718 | 7/1967 | Ruffing | 134/38 X |
| 3,335,087 | 8/1967 | Keers | 134/38 X |
| 3,341,583 | 9/1967 | Anderson et al. | 260/77.5 |
| 3,355,385 | 11/1967 | Mackley | 134/38 X |
| 3,432,451 | 3/1969 | Kales | 260/77.5 |
| 3,446,781 | 5/1969 | Brownsword | 260/75 TN |
| 3,455,855 | 7/1969 | Houghton et al. | 260/77.5 AM X |
| 3,472,802 | 10/1969 | Bownes et al. | 260/77.5 AM X |
| 3,551,204 | 12/1970 | Bolger et al. | 134/42 |

OTHER PUBLICATIONS

J. M. Bust et al.; Advance in Polyurethane Technology; McClaren & Sons, Ltd., London, 1968, page 277 relied on.

*Primary Examiner*—Morris O. Wolk
*Assistant Examiner*—Barry S. Richman
*Attorney*—Glenn H. Bruestle

[57] ABSTRACT

Method of removing a polyurethane resin protective coating from an assembly which may include various types of circuit components and soldered connections, comprising treating the coating with a composition comprising methyl alcohol, ethyl alcohol and toluene until the resin softens sufficiently, and then stripping the softened resin from the assembly. The composition may also include a small proportion of propanol.

4 Claims, No Drawings

METHOD OF REMOVING POLYURETHANE RESIN PROTECTIVE COATING

BACKGROUND OF THE INVENTION

Printed circuit boards containing transistors, resistors, capacitors, and the like, soldered to a network of metal conductors, are sometimes coated overall with a thin layer of protective material. The protective material may be a synthetic resin which is selected to be resistant to such ordinary atmospheric influences as oxidation and moisture. If the printed circuit is to be used in some particular environment with unusual characteristics, the resin protective coating may also need to be resistant to other influences, such as shock and vibration.

A type of synthetic resin which is desirable for such specialized printed circuit use because it is unusually resistant to atmospheric influences as well as to shock and vibration is polyurethane. Consequently, polyurethane resins are being used for printed circuits which have to withstand rugged environmental conditions.

A single printed circuit board unit may have scores, even several hundred individual circuit components, each of which must remain functional during the life of the unit. A single assembled board may represent a significant financial investment. It is therefore wasteful to discard an entire board if only one or several components are found to be defective after assembly is complete. Yet, the chances of finding at least one defective component in an assembled unit containing several hundreds of components is fairly high.

It is highly desirable to be able to remove the defective component or components and replace it (or them) with properly functioning components without injury to the remainder of the assembly. This operation also involves re-coating the replacement components with resin.

There has been a considerable problem in replacing defective circuit components in assemblies coated with polyurethane resins because the properties which make the resin desirable as a protective agent also make it difficult to remove by solvent action. The polyurethanes are resistant to many solvents and most of those which do attack it are sometimes injurious to the circuit components or to the soldered connections.

Consequently, in the past, the usual way to repair circuit boards coated with polyurethane resins has been to use a rotating abrading tool, such as a nylon eraser, to grind away the resin coating in the area of the defective component. This is a tedious and expensive operation and is practically impossible to carry out if the assembly comprises multiple layers with very little space between layers. Moreover, when components are closely spaced on a single layer board, the resin coating between components cannot be removed without some damage to the components themselves, unless extreme care is taken.

The present invention provides a method of rapidly stripping polyurethane resins from all or part of an assembly of electronic circuit components without damage to the components themselves, or to their connectors. The method involves treating the polyurethane resin coating with a composition comprising mostly a combination of methanol and ethanol with a minor amount of toluene. Propanol may be included also for somewhat faster action.

EXAMPLE

The following is an example of removal of a polyurethane resin protective coating from an electronic circuit assembly. The assembly unit comprised a laminated fiberglass module board impregnated with a cured epoxy resin. One side of the board contained only printed circuit wiring which was solder-coated, and solder joints to wires projecting through holes in the board. The other side of the board held additional circuit wiring which was not solder-coated and a multiplicity of closely spaced circuit components including resistors, glass encapsulated diodes, canned transistors, plastic encapsulated transistors, encapsulated capacitors and electrolytic capacitors. The electrolytic capacitors and glass encapsulated diodes had inked identification markings.

Both sides of the board were completely covered with a coating of polyurethane resin about 0.03 inches thick with heavier fillets of resin in certain narrow spaces and around some wire leads.

This module board was placed in a covered glass tray in a preheated dry oven maintained at about 52° C. The tray contained enough of the following composition to completely submerge the module board. All of the percentages are by volume.

40.75% methanol
40.75% ethanol
2.5% propanol
16% toluene

The module board was removed from the solution after 2 hours. As a result of the treatment, the polyurethane resin had completely separated from both sides of the board and, except for the heavier fillets, the polyurethane could be completely removed with gentle finger pressure and with the aid of a small soft-bristled brush in the narrow spaces between components. After removal of all of the resin coating except for the heavier fillets, these latter could be removed if desired by applying additional liquid which was now able to penetrate around the edges and lift the coating.

After the resin coating had been thus substantially completely removed, the circuit was tested for electrical continuity. No electrical degradation of the components was found. Many subsequent test runs were made with similar results.

Many variations may be made in the above example. For example, the treating temperature may be varied downward to ordinary room temperature and may also be somewhat higher than 52° C. At room temperature the treating time is longer, usually two or three times as long as at 52° C. If the temperature is much higher than 52° C. the fire hazard increases to a point where the shortened time does not justify the risk.

The treating time depends not only on the temperature of the bath, but on the thickness of the coating. As the coating thickness decreases, the necessary treating time becomes shorter. It has been found possible, for example, to use coatings of polyurethane resin as thin as 0.005 inch and, with this thickness of coating, the treating time at 52° C. drops to 15 or 20 minutes.

The composition of the treating bath may also be varied. Although the percentage composition given in the above example was found to give best results from the dual standpoint of shortness of treating time required with no damage to the components, their ink markings or the solder connections, certain compositional changes can be made.

The propanol may be omitted entirely although it provides somewhat shorter treating times in amounts up to about 2 or 3 percent. Since propanol is usually present as a denaturant in commercial ethyl alcohol, it is more convenient and economical to leave it in the composition than to omit it.

The ethanol may be varied from about 10 to about 41 percent in combination with a corresponding amount of methanol so that these two components together preferably equal about 82 percent of the total composition when the amount of toluene is about 16 percent. If the amount of toluene is decreased, the total combined percentage of ethanol and methanol is correspondingly raised, and if the percentage of toluene is raised to its maximum, the combined methanol-ethanol percentage is lowered.

Although methanol, alone, exerts a certain softening effect on polyurethane resins, the treating time required has been found to be undesirably long for any practical commercial use. When ethanol is used in combination with methanol, the treating time is shortened. And when toluene is added to these, treating time is still further shortened. The toluene may be used in percentages from about 1–20 percent by volume. Under 1 percent the accelerating effect is not significant, and above about 16 percent the composition begins to attack the identification markings on the modules which were tested and also starts to attack the plastic encapsulants which are on some circuit components. Therefore, percentages of toluene above 16 percent are preferably not used where ink markings are present or where other resins are present which may be attacked.

Although, in the example given, the entire module board was immersed in the treating composition, the treatment can also be confined to localized areas for the replacement of one or a few components. In this case the treated area can be surrounded with a wax dam and this dam, only, filled with liquid. After the proper time interval, the liquid can be drained and the softened area of resin removed without harm to the rest of the assembly. If some of the surrounding area of resin is somewhat softened by the liquid, it will revert to its adherent condition when the liquid is evaporated.

Substrates other than fiber glass-epoxy laminated boards can be used in the invention; for example, phenol formaldehyde and melamine formaldehyde impregnated paper or cloth laminated types, glass or ceramics.

Also, the conductors of the printed circuit may be any conventionally used metal including copper or copper plated with nickel or gold, or a combination of metals.

We claim:

1. A method of removing a polyurethane resin protective coating from an electronic apparatus assembly comprising a printed circuit board containing solder joints and miniature circuit components, said method comprising treating said resin coating with a composition comprising by volume:

70–41% methanol
10–41% ethanol
1–20% toluene
0–2.5% propanol until said coating is sufficiently softened and starts to separate from said board, and then mechanically stripping said coating from said board and said components.

2. A method according to claim 1 in which said composition comprises:

40.75% methanol
40.75% ethanol
16% toluene
2.5% propanol

3. A method according to claim 1 in which said board is a laminated fiber glass-epoxy resin type.

4. A method according to claim 1 in which said coating is about 0.03 inch thick, said board is immersed in said composition, said composition is maintained at a temperature of about 52° C., and said board is removed after a period of about 1 to 2 hours.

* * * * *

UNITED STATES PATENT OFFICE

CERTIFICATE OF CORRECTION

Patent No. 3,661,641 Dated May 9, 1972

Inventor(s) Michael Walter Vigh & Harold Thomas Rocheleau

It is certified that error appears in the above-identified patent and that said Letters Patent are hereby corrected as shown below:

In the heading, after the listing of inventors, add the statement:

Assignee: RCA Corporation

Signed and sealed this 19th day of September 1972.

(SEAL)
Attest:

EDWARD M.FLETCHER,JR.
Attesting Officer

ROBERT GOTTSCHALK
Commissioner of Patents